United States Patent
Jerbi et al.

(10) Patent No.: US 10,641,923 B2
(45) Date of Patent: May 5, 2020

(54) METHOD FOR CHARACTERIZING AND EXPLOITING A SUBTERRANEAN FORMATION COMPRISING A NETWORK OF FRACTURES

(71) Applicant: IFP Energies nouvelles, Rueil-Malmaison (FR)

(72) Inventors: Chahir Jerbi, Nanterre (FR); Andre Fourno, Rueil-Malmaison (FR); Benoit Noetinger, Sevres (FR)

(73) Assignee: IFP Energies nouvelles, Rueil-Malmaison (FR)

( * ) Notice: Subject to any disclaimer, the term of this patent is extended or adjusted under 35 U.S.C. 154(b) by 447 days.

(21) Appl. No.: 15/382,751

(22) Filed: Dec. 19, 2016

(65) Prior Publication Data
US 2017/0212276 A1 Jul. 27, 2017

(30) Foreign Application Priority Data
Dec. 17, 2015 (FR) ..................................... 15 62615

(51) Int. Cl.
*G06F 17/16* (2006.01)
*G01V 99/00* (2009.01)
(Continued)

(52) U.S. Cl.
CPC ............ *G01V 99/005* (2013.01); *E21B 43/00* (2013.01); *G01V 3/38* (2013.01); *G01V 11/00* (2013.01);
(Continued)

(58) Field of Classification Search
None
See application file for complete search history.

(56) References Cited

U.S. PATENT DOCUMENTS 6,842,725 B1 * 1/2005 Sarda .................... G01V 11/00
703/10
7,334,486 B1 * 2/2008 Klammler ........... E21B 47/1015
73/861.07
(Continued)

FOREIGN PATENT DOCUMENTS

EP 2 453 106 A1 5/2012
EP 2 530 493 A1 12/2012

OTHER PUBLICATIONS

J. E. Warren, P. J. Root, "The Behavior of Naturally Fractured Reservoirs" pp. 245-255, 1963 (Year: 1963).*
(Continued)

*Primary Examiner* — Kibrom K Gebresilassie
(74) *Attorney, Agent, or Firm* — Fitch, Even, Tabin & Flannery LLP

(57) ABSTRACT

The invention is a method for exploring and exploiting a fluid in a subterranean formation comprising a network of fractures. On the basis of measurements of properties relating to the formation, a meshed representation of the formation, and statistical parameters relating to the network of fractures, each mesh of the meshed representation is broken down into at least one unfractured matrix block and an equivalent permeability tensor of the network of fractures in the mesh concerned is determined. A matrix block characteristic dimension is then determined according to a relation that is a function at least of the eigenvalues of the equivalent permeability tensor. Based on the meshed representation, the characteristic dimension and a flow simulator, there is defined an optimum exploitation scheme for the fluid of the formation and said fluid is exploited as a function of the optimum exploitation scheme.

12 Claims, 2 Drawing Sheets

(51) Int. Cl.
*E21B 43/00* (2006.01)
*G01V 11/00* (2006.01)
*G01V 3/38* (2006.01)
*G06F 30/20* (2020.01)
*G06F 111/10* (2020.01)

(52) U.S. Cl.
CPC .............. *G06F 17/16* (2013.01); *G06F 30/20* (2020.01); *G01V 2210/646* (2013.01); *G06F 2111/10* (2020.01)

(56) References Cited

U.S. PATENT DOCUMENTS

| | | | | |
|---|---|---|---|---|
| 7,565,278 | B2* | 7/2009 | Li | G06F 17/5018 |
| | | | | 703/10 |
| 8,983,818 | B2* | 3/2015 | Fourno | E21B 43/00 |
| | | | | 703/10 |
| 2002/0016702 | A1* | 2/2002 | Manceau | G01V 11/00 |
| | | | | 703/10 |
| 2005/0027499 | A1* | 2/2005 | Bourbiaux | G01V 11/00 |
| | | | | 703/10 |
| 2005/0273303 | A1* | 12/2005 | Flandrin | G06T 17/20 |
| | | | | 703/10 |
| 2007/0016389 | A1* | 1/2007 | Ozgen | E21B 47/00 |
| | | | | 703/10 |
| 2008/0133186 | A1* | 6/2008 | Li | G06F 30/23 |
| | | | | 703/2 |
| 2009/0164189 | A1* | 6/2009 | Bourbiaux | E21B 43/00 |
| | | | | 703/10 |
| 2010/0204972 | A1* | 8/2010 | Hsu | E21B 49/006 |
| | | | | 703/10 |
| 2010/0274547 | A1* | 10/2010 | Bourbiaux | G01V 11/00 |
| | | | | 703/10 |
| 2012/0116740 | A1* | 5/2012 | Fourno | E21B 43/00 |
| | | | | 703/10 |
| 2012/0125616 | A1* | 5/2012 | Graue | E21B 41/0064 |
| | | | | 166/305.1 |
| 2012/0179436 | A1* | 7/2012 | Fung | E21B 49/00 |
| | | | | 703/2 |
| 2013/0096889 | A1* | 4/2013 | Khvoenkova | G06F 17/10 |
| | | | | 703/2 |
| 2013/0138406 | A1 | 5/2013 | Khvoenkova et al. | |
| 2014/0372095 | A1 | 12/2014 | van der Zee et al. | |
| 2015/0006136 | A1* | 1/2015 | Hinkley | G06F 17/5009 |
| | | | | 703/10 |
| 2015/0019183 | A1* | 1/2015 | Suzuki | E21B 43/16 |
| | | | | 703/2 |
| 2016/0357883 | A1* | 12/2016 | Weng | E21B 43/26 |
| 2017/0074770 | A1* | 3/2017 | Fourno | G01N 15/082 |
| 2017/0275970 | A1* | 9/2017 | Crawford | G01V 99/005 |

OTHER PUBLICATIONS

Search Report Issued in corresponding French Application No. 1562615 dated Aug. 18, 2016 (8 pages).

* cited by examiner

METHOD FOR CHARACTERIZING AND EXPLOITING A SUBTERRANEAN FORMATION COMPRISING A NETWORK OF FRACTURES

CROSS REFERENCE TO RELATED APPLICATIONS

Reference is made to French Application No. 15/62.615 filed Dec. 17, 2015, which is incorporated herein by reference in its entirety.

BACKGROUND OF THE INVENTION

Field of the Invention

The present invention relates to the oil industry and more particularly to the exploration and exploitation of hydrocarbon deposits and geological gas storage sites.

The invention concerns in particular a method for constructing a representation of a subterranean formation crossed by any network of fractures and the use of that representation for the simulation of the flows of fluid in the formation concerned.

Description of the Prior Art

The petroleum industry and more specifically the exploration and exploitation of wells, notably oil wells, necessitate the acquisition of as precise as possible a knowledge of the subterranean geology in order to provide effective evaluation of the reserves, modeling of production, and management of exploitation. In fact, the determination of the location of a production or injection well in a hydrocarbon deposit, the constitution of the drilling sludge, the completion characteristics, the choice of a method of recovering the hydrocarbons (such as the injection of water, for example) and the parameters necessary for the use of that method (such as the injection pressure, the production flow rate, etc.) necessitate a substantial knowledge of the deposit. Knowing a deposit means having access to as accurate as possible a description of the structure, petrophysical properties, fluid properties, etc. of the deposit being studied.

To acquire this knowledge, the petroleum industry combines measurements in the field (carried out in situ, during seismic campaigns, measurements in wells, core samples, etc.) with experimental modeling (carried out in the laboratory) and numerical simulations (using software).

Formalizing this knowledge then entails establishing a reproduction of the subsoil, termed a "geological model", which makes it possible to take account of these aspects in an approximate manner. This type of model is generally represented on a computer, in which case it is referred to as a numerical model. A reservoir model includes a meshed representation (in the form of a regular grid or in the form of a more general meshing), generally in three dimensions, with at least one petrophysical property (porosity, permeability, saturation, etc.) being assigned to each of the meshes of the meshed representation.

In order to reproduce or to predict (i.e. "simulate") the real production of hydrocarbons, the reservoir engineer employs software termed a "reservoir simulator". The reservoir simulator is a flow simulator that calculates the flows and the evolution of the pressures in the reservoir represented by a "reservoir model". The reservoir model may coincide with the geological model if the computing power available for carrying out the flow simulations makes this possible. If not, the reservoir model can be obtained using an upscaling technique to go from the geological model (having the finest meshes) to the reservoir model (having coarser meshes). This upscaling step is well known to reservoir engineers and may be carried out using the CobraFlow software from IP Energies nouvelles, France, for example.

The results of these calculations then make it possible to predict and to optimize exploitation schemes (defining the number of wells to be drilled, their position, the assisted recovery mode, etc.) of the deposit being studied in order to improve at least one of the flow rates and the quantities of hydrocarbons to be recovered. The calculation of the behavior of the reservoir according to a given production scenario constitutes a reservoir simulation.

The following documents will be cited in the description:

Bourbiaux, B., Cacas, M. C., Sarda, S. and Sabathier J. C., 1998, "A Rapid and Efficient Methodology to Convert Fractured Reservoir Images into a Dual-Porosity Model", Oil & Gas Science and Technology, Vol. 53, No. 6, November-December 1998, 785-799.

Oda, M., 1985, Permeability Tensor for Discontinuous Rock Masses, Geotechnique Vol 35, Issue 4, 483-495.

Warren, J. E. and Root, P. J., "The Behavior of Naturally Fractured Reservoirs", SPE Journal (September 1963), 245-255.

Fractured reservoirs constitute an extreme type of heterogeneous geological reservoirs including two contrasting media which are a matrix medium containing the greater part of the oil present and having a low permeability and a highly conductive fractured medium representing less than 1% of the oil present. The fractured medium itself may be complex, consisting of different families of fractures characterized by their density, and distributions bearing on the length of the fractures of each family, their orientation in space and their openness. The term "fracture" refers to a plane discontinuity that is very thin compared to its extent and that represents a rupture plane of a rock of the deposit.

Reservoir engineers in charge of the exploitation of fractured reservoirs need as perfect or possible knowledge of the role of the fractures. On the one hand, the knowledge of the distribution and the behavior of these fractures makes it possible to optimize the production schemes for a hydrocarbon deposit, that is the number of wells to be drilled, their location, their geometry, the type of recovery fluid injected, etc. On the other hand, the geometry of the network of fractures conditions the movement of the fluids as much at the scale of the reservoir as at the local scale, where it determines elementary matrix blocks in which the oil is trapped. Knowing the distribution of the fractures is also very useful for the reservoir engineer seeking to calibrate the models they are constructing so that the models that are constructed reproduce past production curves in order to predict future production reliably. To this end, geoscientists use three-dimensional images of the deposits making it possible to locate a great number of fractures.

Confronted with the complexity of fractured media, reservoir engineers often use a "double-medium" type approach to represent this type of medium. Described for example in (Warren and Root, 1963), this approach assumes that any elementary volume of the fractured reservoir (any mesh of the reservoir model) is modeled in the form of a set of identical parallelepipedal blocks, termed matrix blocks, delimited by an orthogonal system of continuous uniform fractures oriented in the principal flow directions. The flow of the fluids at the scale of the reservoir essentially occurs via the fractures and exchanges of fluids occur locally between the fractures and the matrix blocks. The meshes most often have lateral dimensions on a hectometer scale (commonly 100 or 200 m) given the size of the fields and the limited capabilities of the simulation software in terms of calculation time and capacity. A result of this is that, for most of the fractured fields, the fractured reservoir elementary volume (mesh) encompasses numerous fractures forming a complex network delimiting multiple matrix blocks with dimensions and shapes varying according to the geological context. Each of the constituent real blocks exchanges fluids with the fractures that surround it at a rhythm (flow rate). that is specific to it because it depends on the dimensions and the shape of that particular block.

Faced with this kind of geometrical complexity of the real medium, the approach of reservoir engineers consists, for each reservoir elementary volume (mesh), in representing the real fractured medium as a set of matrix blocks that are all identical and parallelepipedal, delimited by an orthogonal and regular network of fractures oriented in the principal flow directions. For each mesh, there are determined in this way the so-called "equivalent" permeabilities of this network of fractures and a matrix block is defined that is termed "representative" (of the real (geological) distribution of the blocks), which are unique and parallelepiped in shape. It is then possible to formulate and to calculate the matrix-fissure exchange flows for this "representative" block and to multiply the result thereof by the number of such blocks in the elementary volume (mesh) to obtain the flow at the scale of that mesh.

One of the steps of the double-medium approach therefore determines the characteristic dimension of the representative matrix blocks for each mesh of the reservoir model. This determination must be as accurate as possible in order to take into account optimum flows in the reservoir. This step must also be carried out within reasonable calculation times in order to render the double-medium approach routinely applicable, even for subterranean formations featuring complex networks of fractures.

PRIOR ART

The known patent applications FR 2757957 Corresponding U.S. Pat. No. 6,064,944) and FR 2923930 Corresponding U.S. Pat. No. 8,688,424) describe a method making it possible to calculate the characteristic dimension of a matrix block representative of the unfractured blocks of rock on the basis of a discrete fracture network model, image analysis and interpolation of an invasion curve. This method is applied layer by layer and notably necessitates image analysis (pixelization) for each layer of the subterranean formation being studied. The size of blocks in the plane of each layer is then relatively well characterized but that in a plane perpendicular to the layers (often a sub-vertical plane) is not accessible. This approach is therefore a 2D approach, which does not make it possible to represent correctly the reality of the fractured media. Moreover, this method necessitates image analysis (pixelization) for each layer and is therefore relatively costly. This method will be termed a pixelization method hereinafter.

Also known is a matrix block size calculation method termed a ray tracing method. Starting from a discrete fracture network model, this method draws straight line segments in a mesh and counts the number of intersections of that straight-line segment with the fractures of the discrete fracture network. An approximate matrix block characteristic dimension is then equal to the length of the segment referred to the number of intersections determined. The major defect of this method is that it does not take into account the connectivity of the network of fractures. For example, for the same ray density, a connected network could have a block size identical to that of a relatively unconnected network, whereas the flow in these two networks is in fact different. The second defect is that it yields a result that is a function of the position and the density of the rays that are traced. In the case of a relatively low-density network of fractures, for example, two applications of this method, with two different ray tracings, can therefore yield different results. This method, which is nevertheless efficient in terms of calculation time, is for example implemented in the FracaFlow software from IFP Energies nouvelles, France.

SUMMARY OF THE INVENTION

The present invention concerns a method for exploiting a subterranean formation by use of a method of determining the characteristic dimension of a matrix block representative of the unfractured blocks of rock for at least one mesh of the reservoir model on the basis of the calculation of an equivalent permeability tensor of the network of fractures and without necessarily using a discrete fracture network model. The method according to the invention is moreover three-dimensional and of relatively low cost in terms of calculation time.

Thus, the present invention concerns a method for the exploitation of a fluid in a subterranean formation crossed by a network of fractures in which, on the basis of measurements of properties relating to the formation, a meshed representation of the formation is constructed and statistical parameters are determined relating to the network of fractures. The method includes at least one of the following steps for at least one mesh of said meshed representation:

A. the mesh is broken down into at least one matrix block, the at least one matrix block representing a non-fractured portion of the formation, at least one block being delimited by fractures of the network of fractures present in the mesh;

B. an equivalent permeability tensor of the network of fractures in the mesh is determined;

C. principal directions of flow and the eigenvalues of the equivalent permeability tensor in the directions are determined;

D. a characteristic dimension of the matrix block is determined according to a relation that is a function at least of the eigenvalues of the permeability tensor; and on the basis of at least the meshed representation, the characteristic dimension of the matrix block and a flow simulator, there is defined a scheme of optimum exploitation of the fluid of the formation and the fluid of the formation is exploited as a function of the optimum exploitation scheme.

According to one embodiment of the present invention, the statistical parameters may be chosen from the following parameters: fracture density, fracture length, fracture orientation in space, fracture openness and distribution of fractures in the formation.

The equivalent permeability tensor for the mesh may advantageously be determined by constructing beforehand a discrete fracture network model for the mesh.

According to one embodiment of the present invention, the characteristic dimension of the matrix block of said mesh may be determined using a formula of the following form:

$$t^i = \left( \frac{2k_f e_f}{\sum_{j=1}^{3} (-1)^{\delta_{ij}} K_j} \right)$$

where $K_j$ is the eigenvalue of the equivalent permeability tensor in the principal direction j, with j varying from 1 to 3, $k_f$ and $e_f$ are respectively predetermined values of permeability and thickness representative of all the fractures of the network of fractures, and $t^i$ is the characteristic dimension of the matrix block in the principal direction of flow i, with i being variable from 1 to 3.

According to one embodiment of the present invention, the characteristic dimension of the matrix block of the mesh may be determined using a formula of the following form:

$$t^i = \left( \frac{2k_f}{\sum_{j=1}^{3} (-1)^{\delta_{ij}} K_j} - 1 \right) e_f$$

where $K_j$ is the eigenvalue of the equivalent permeability tensor in the principal direction j, with j varying from 1 to 3, $k_f$ and $e_f$ are respectively predetermined values of permeability and thickness representative of all the fractures of the network of fractures, and $t^i$ is the characteristic dimension of the matrix block in the principal direction of flow i, i being able to vary from 1 to 3.

According to another embodiment of the present invention, the characteristic dimension of the matrix block of the mesh may be determined using a relation that is a function of at least the eigenvalues of the equivalent permeability tensor and an equivalent surface permeability tensor, the equivalent surface permeability tensor being determined by at least the following steps:
  the mesh is re-oriented in the principal directions of flow;
  for each principal direction of flow, there is determined the flow of the fluid leaving traces of fractures present on the faces of the re-oriented mesh perpendicular to the principal direction; and
  for each principal direction of flow, the equivalent surface permeability is determined in the direction by equivalence of the flow with a flow representative of a homogeneous medium.

There may advantageously be further determined a criterion of acceptability of the representation of the mesh by a plurality of matrix blocks with the same characteristic dimension.

The mesh for which the steps A) to D) are carried out may preferably be a representative mesh of a group of meshes of the meshed representation, the group of meshes being determined for example on a basis of at least a statistical parameter and in which in the step D) the characteristic dimension may be assigned to the matrix blocks of the meshes of the group.

According to one embodiment of the invention, the optimum exploitation scheme may be defined by determining a method of recovery of the fluid and a number, a layout, at least one of a geometry of injector and producer wells making possible satisfaction of predefined technical and economic criteria.

The exploitation of the fluid as a function of the optimum exploitation scheme may advantageously consist at least in drilling at least one of injector and producer wells and producing the fluid by the recovery method.

The invention further concerns a computer program product that can be downloaded from a communication network and/or stored on a tangible computer-readable medium which is executable by a processor, comprising program code instructions for executing the method according to the above description when the program is executed by a computer.

Other features and advantages of the method according to the invention will become apparent on reading the following description of nonlimiting embodiments with reference to the appended figures, which are described hereinafter.

DETAILED DESCRIPTION OF THE INVENTION

Figure 1:
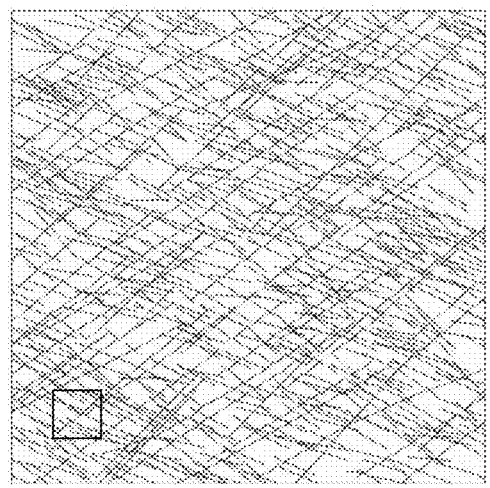
FIG. 1 shows an example of a network of fractures in a horizontal section executed in a subterranean formation.

The method according to the invention concerns the exploitation of a fluid in a subterranean formation crossed by a network of fractures. Without this being limiting on the invention, the subterranean formation consists of at least one reservoir rock layer that is a rock that is at least porous and preferably permeable. The exploitation of the fluid present in at least the reservoir rock layer is intended to extract the fluid from that reservoir rock. Without this being limiting on the invention, the fluid in question is of hydrocarbon type (oil, gas, bitumen, etc.). Without this being limiting on the invention, the subterranean formation may have a plurality of geological layers with each geological layer possibly comprising its own network of fractures, and each network possibly consisting of a plurality of fracture families.

According to the invention, the subterranean formation is represented by a meshed representation. Each of the meshes of that representation include one or more values of properties relating to the formation being studied. According to the invention, a double-medium approach is used to represent the fractured medium present in a mesh, this approach breaks each mesh down into identical matrix blocks that are parallelepipedal, delimited by an orthogonal and regular network of fractures oriented according to principal directions of flow.

The method according to the present invention is based on a method for determining the matrix block characteristic dimension for at least one mesh of the meshed representation representing the formation being studied.

The present invention requires:
  measurements of properties relating to the formation being studied which may be measurements of petrophysical properties carried out in situ, at different points of the formation being studied, such as the porosity, the permeability and the lithology (i.e. the type of rock), the relative permeability or the capillary pressure. These measurements may have been obtained from core samples, for example, via logging in wells, via seismic acquisition campaigns. However, they may also be measurements (of oil flow rates, water flow rates, pressure variations, for example) linked to the flows in the layer being studied, obtained for example by starting production of the fluid in some wells crossing the formation, during well tests or interference tests. These properties may notably be used to construct a meshed representation of the formation being studied. In order to characterize optimally the network of fractures present in the formation, these may also be measurements concerning the orientation, the angle of dip or the extent of the fractures present in the formation being studied. This information is determined from logging measurements or measurements on outcrops, for example.

A meshed representation representative of the formation being studied: also termed a "reservoir model", is a reproduction of the subsoil constructed with the goal of describing as accurately as possible the structure, the petrophysical properties of the formation being studied or the properties of the fluids present in the formation. This model is generally represented on a computer and uses a mesh or grid with each of the meshes of this grid including one or more values of properties relating to the formation being studied (porosity, permeability, saturation, etc.). A reservoir model must verify as much as possible the properties relating to the formation being studied collected in the field which are the logging data measured along the wells, the measurements effected on rock samples taken in the wells, the data deduced from seismic acquisition campaigns, the production data such as the flow rates of oil, water, the pressure variations, etc. The reservoir simulation reservoir engineer is fully aware of methods for constructing a meshed representation of a formation of this kind. Note that the reservoir model may coincide with the geological model if there is sufficient computing power to make possible numerical calculations simulating flow on a fine-mesh grid. Otherwise, the reservoir engineer could employ an upscaling technique in order to go from a fine-mesh model (the geological model) to a model with coarser meshes (the reservoir model). This upscaling step may be carried out using the CobraFlow software from IFP Energies nouvelles, France, for example.

A flow simulator is a numerical program executed on a computer that is used to predict the flow of fluids in a formation. Flow simulation, also termed reservoir simulation, numerically predicts the production of a fluid trapped in one or more layers of a subterranean formation, with production necessitating the existence of at least one injector well (into which is injected another fluid that will expel the trapped fluid) and a producer well (to which the expelled trapped fluid will move and from which it will be possible to extract it). A so-called "double-medium" flow simulator will advantageously be used and make it possible modelling the exchanges between the unfractured blocks of rock (matrix blocks) and the network of fractures without necessitating discretization of those blocks. One example of a simulator of this kind is the PUMAFLOW software from IFP Energies nouvelles, France.

The method according to the invention includes at least the following steps:
1. Characterization of the network of fractures
   1.1 Determination of statistical parameters
   1.2 Determination of representative meshes (optional)
   1.3 Construction of a discrete fracture network model (optional)
2 Characterization of a double-medium representation
   2.1 Breakdown according to a double-medium representation
   2.2 Determination of an equivalent permeability tensor
   2.3 Diagonalization of the equivalent permeability tensor
   2.4 Determination of the matrix block characteristic dimension
   2.5 Quality control (optional)
3. Optimum exploitation scheme of the fluid from the formation Step 1 may comprise one, two or three steps, with the sub-steps 1.2 and 1.3 being optional. The sub-step 1.1 is to be applied globally for the formation being studied. The optional sub-step 1.2 determines, for example from statistical parameters determined in the sub-step 1.1, at least one representative mesh of a group of meshes of the meshed representation. The optional sub-step 1.3 determines a discrete fracture network model. This sub-step may be effected for a mesh of the meshed representation or for a representative mesh of a group of meshes of the meshed representation, where appropriate (cf. optional step 1.2); it may be repeated for each of the meshes of the meshed representation or for each of the meshes representative of groups of meshes of the meshed representation, where appropriate (compare optional step 1.2). Determining and then considering a representative mesh of a group of meshes for subsequent calculations may be advantageous in terms of calculation time. In fact, calculations required in a step or sub-step may for example be effected only for the representative mesh concerned and the result of those calculations then assigned to each of the meshes of the group of meshes, thus saving on calculation time.

The step 2 is based on the use of a double-medium representation of the formation and is broken down into at least four sub-steps 2.1 to 2.4, the step 2.5 being optional. These four (and where applicable five) sub-steps are to be implemented for a mesh of the meshed representation or for a representative mesh of a group of meshes of the meshed representation, where appropriate (compare optional step 1.2). They may be repeated for each of the meshes of the meshed representation or for each of the meshes representative of groups of meshes of the meshed representation, where appropriate (compare optional step 1.2).

The principal steps of the present invention are described in detail below. The sub-steps 1.3 and 2.1 to 2.4 are instantiated for a given mesh, which may be a representative mesh or not.

1. Characterization of the Network of Fractures

During this step, it is a question of characterizing the network of fractures from the measurements of properties relating to the formation carried out in situ.

1.1 Determination of Statistical Parameters

During this sub-step, it is a question of determining statistical parameters (termed PSF), such as the orientation of the fractures or the fracture density, making possible characterization of the network of fractures of the layer being studied. This sub-step requires measurements making possible direct or indirect characterization of the fracturing. Information on the fracturing of a geological layer can be obtained via:

core samples extracted from the formation being studied and on the basis of which a statistical study of the intersected fractures can be effected; at least one of outcrops, which have the advantage of providing a large-scale view of the network of fractures; and at least one of seismic images, making it possible to identify large geological events and the geometry of the various structures of the formation.

A plurality of statistical fracture parameters are preferably determined in order to characterize optimally the fracturing present in the formation, and the parameters may be chosen from the density of the observed fractures, their length, their orientation in space, their openness, their permeability and their distribution in the layer being studied.

This provides statistical parameters describing the network of fractures of the formation being studied. These parameters can be used to determine meshes representative of the meshed representation (cf. optional sub-step 1.2) and/or a discrete fracture network model (cf. optional sub-step 1.3) at the scale of a mesh of the meshed representation or of a representative mesh of the meshed representation.

1.2 Determination of Representative Meshes (Optional)

This sub-step is optional and consists in determining at least one representative mesh of a group of meshes of the meshed representation.

According to one embodiment of the invention, a group of meshes of the meshed representation is constituted according to a criterion based on the characteristics of the network of fractures present in the meshes, for example by a similarity measurement. The meshes grouped into a group of meshes therefore have similar fracture characteristics. Without this being limiting of the invention, this similarity analysis may be effected on the basis of the statistical parameters describing the network of fractures, with those parameters being determined in the sub-step 1.1.

According to one embodiment of the invention, a representative mesh is assigned to the group of meshes of the meshed representation produced in this way. Without this being limiting on the invention, the group of meshes can be assigned any mesh of the group of meshes or a mesh the characteristics (for example the orientation of the fractures) of which approximate the average of the characteristics of the group of meshes in question.

According to one embodiment of the present invention, following this step a plurality of groups of meshes will have been constituted so that any mesh of the meshed representation has been assigned to a group of meshes with each group of meshes being associated with a representative mesh.

It may be advantageous to consider a representative mesh of a group of meshes with a view to saving calculation time. In fact, the required calculations may be effected in a step or sub-step for the representative mesh concerned, for example, and the result of those calculations then assigned to each of the meshes of the group of meshes, thus resulting in a saving in calculation time.

1.3 Construction of a Discrete Fracture Network Model (Optional)

This sub-step is optional and constructs by use of a discrete fracture network (DFN) model a realistic image of the network of fractures characterized by the statistical parameters (PSF) determined in the sub-step 1.1.

This sub-step may be implemented for a mesh of the meshed representation or for a representative mesh of a group of meshes of the meshed representation, where appropriate (compare optional step 1.2), and repeated for each of the meshes of the meshed representation or for each of the meshes representative of groups of meshes of the meshed representation, where appropriate (compare optional step 1.2).

Figure 2:
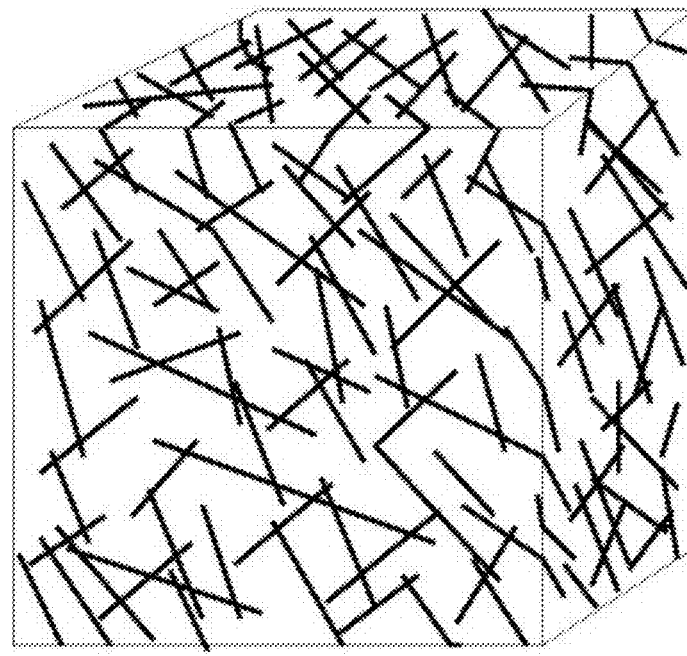
FIG. 2 shows an example of a discrete network of fractures visible at the scale of the three-dimensional mesh with 2D limits thereof being shown by the square in FIG. 1.

During this sub-step, there is therefore associated with at least one given mesh a detailed representation (DFN) of the internal complexity of the network of fractures that is as faithful as possible to the direct and indirect observations of the reservoir. FIG. 1 shows a horizontal section in a layer of a formation and the network of fractures that can be observed at the scale of the formation for that section. FIG. 2 shows the discrete network of fractures that can be seen at the scale of the three-dimensional mesh the 2D limits of which are shown by the square in FIG. 1. This discrete fracture network constitutes an image representative of the real network of fractures delimiting non-fractured matrix blocks of irregular shape and size.

To construct a discrete fracture network (DFN) model in at least one mesh of the meshed representation modeling software may be used that is well known to reservoir engineers, such as the FRACAFlow® software from IFP Energies nouvelles, France.

2 Characterization of a Double-Medium Representation

During this step, it is a question of breaking down the mesh concerned according to a "double-medium" representation and characterizing that representation.

The following steps are performed for a mesh, which may be a mesh of the meshed representation or a representative mesh of a group of meshes of the meshed representation, where applicable (compare optional step 1.2). These steps may be repeated for each of the meshes of the meshed representation, whether representative or not.

2.1 Breakdown According to a Double-Medium Representation

During this sub-step a "double-medium" approach is used as described in (Warren and Root, 1963) to represent the formation being studied in a simplified manner and notably its network of fractures. Thus the "double-medium" approach simplifies the medium contained in a mesh by assuming that the medium is made up of at least one non-fractured matrix block that is a block of only a matrix and not including any fractures) and by a fractured medium (including the fractures), the matrix block being delimited by the fractures.

There are conventionally three parameters for each mesh considered in this simplified representation of a fractured medium, whether representative or not: First the characteristic dimension of the matrix block, second the equivalent permeability tensor of the matrix block and third the equivalent permeability tensor of the fracture medium. Note that the equivalent permeability tensor of the matrix block is assumed to be known on commencing the method according to the invention and corresponds to the permeability entered in each of the meshes of the meshed representation obtained after upscaling the geological model, for example. This upscaling step is well known to the reservoir engineers and may be carried out using the CobraFlow software from IFP Energies nouvelles, France, for example.

The following sub-steps have a goal to determine the permeability tensor of the fractured medium for the mesh concerned and the characteristic dimension of the non-fractured matrix block for the same mesh.

2.2 Determination of an Equivalent Permeability Tensor

During this sub-step, an equivalent permeability tensor of the network of fractures is determined for the mesh concerned. A permeability tensor is a mathematical object making it possible to represent a spatial permeability heterogeneity in a subterranean formation. In particular, in the case of a formation including a network of fractures, the flow of the fluids is directional (for example, the permeability in a formation may be strong in one direction and weak in the perpendicular direction). The term equivalent permeability tensor is used to indicate that this tensor characterize an "average" behavior vis a vis the flows. Each fracture of a network of fractures therefore has its own permeability and contributes to the flow in the subterranean formation. All these contributions are averaged by an equivalent permeability, which is of tensor form, the flow itself being directional.

This sub-step may be based on the discrete fracture network (DFN) model, where appropriate (compare optional step 1.3) or obtained directly from the statistical parameters (PSF) determined in the step 1.1. This type of calculation of the equivalent permeabilities is well known to reservoir engineers. A permeability tensor representative of the flow properties of the network of fractures can therefore be obtained, for example:

by an analytic method termed "local analytical upscaling" described for example in the document (Oda, 1985) or in the patent application FR 2918179 (Corresponding to U.S. Pat. No. 8,078,405). This method has the advantage of being very fast and does not necessitate a discrete fracture network (DFN) model. However, its application is limited to well-connected networks of fractures. Otherwise, large errors may occur in the permeability tensor.

by a numerical method termed "local numerical upscaling" described for example in the document (Bourbiaux, et al., 1998) or in the patent application FR 2757947 (Corresponding to U.S. Pat. No. 6,023,656) for the calculation of the equivalent permeabilities. This method is based on the numerical solution of the equations of flow over a discrete meshing of the fracture network (DFN) for different limit conditions applied to the column of meshes of the calculation concerned. The equivalent permeability tensor is obtained by identification of the ratios between flow rate and head loss at the limits of the calculation field. This approach, which is more costly than the previous one, has the advantage of characterizing a given network well (even if it is relatively unconnected). The numerical method of calculating equivalent properties of fracture media implemented in the FRACAFlow® software from IFP Energies nouvelles, France may be used, for example.

According to one embodiment of the invention, the permeability tensor is determined considering thicknesses and permeabilities of fractures that are constant (denoted $e_f$ and $k_f$ hereinafter) for all of the fractures of the network of fractures of the formation concerned.

According to another embodiment of the invention, the equivalent permeability tensor is determined from the characteristics of the network of fractures in each of the meshes of the meshed representation, those characteristics coming for example from the PSF (determined in the sub-step 1.1) and/or the DFN (determined in the sub-step 1.3).

2.3 Diagonalization of the equivalent permeability tensor

During this sub-step there are determined from the equivalent permeability tensor determined in the preceding sub-step the principal directions of flow in the mesh concerned and the eigenvalues of the tensor in the principal directions determined in this way.

According to one embodiment of the invention, this determination is effected by diagonalization of the equivalent permeability tensor determined in the preceding sub-step.

According to the invention, there are obtained during this sub-step the three principal directions of the flow, hereinafter denoted $dir_1$, $dir_2$ and $dir_3$. The directions $dir_1$ ($dir_2$ and $dir_3$) are chosen so that its angle to the abscissa axis (respectively the ordinate axis, the vertical axis) is as small as possible. The three eigenvalues of this tensor are also obtained, hereinafter denoted $K_1$, $K_2$, $K_3$, associated with the three principal directions $dir_1$, $dir_2$ and $dir_3$, respectively.

2.4 Determination of the Matrix Block Characteristic Dimension

According to the invention, during this sub-step a characteristic dimension of the matrix block is determined for the mesh concerned.

According to an embodiment of the invention in which the permeability tensor is determined by considering thicknesses and permeabilities of fractures that are constant for all of the fractures of the network of fractures (cf. sub-step 2.2), a characteristic dimension of the matrix block for the mesh concerned is determined using a formula of the form:

$$t^i = \left( \frac{2k_f}{\sum_{j=1}^{3}(-1)^{\delta_{ij}}K_j} - 1 \right) e_f \quad (1)$$

where $K_j$ is the eigenvalue of the equivalent permeability tensor of the network of fractures in the mesh concerned according to the principal direction $dir_j$, with j varying from 1 to 3, the tensor being calculated in the sub-step 2.2 and the principal directions and eigenvalues of the tensor being determined in the sub-step 2.3; $k_f$ and $e_f$ are respectively values predefined by the reservoir engineer of permeability and thickness representative of all the fractures of the network of fractures and $t^i$ is the characteristic dimension of the matrix block in the principal flow direction $dir_i$, i varying from 1 to 3. One embodiment of the invention uses $k_f=100$ mD and $e_f=0.001$ m. According to this last embodiment of the invention, in which it is further assumed that the sizes of the blocks are significantly greater than the thicknesses of the fractures, the formula (1) may be simplified according to a formula of the following type (using the notation described above):

$$t^i = \left( \frac{2k_f e_f}{\sum_{j=1}^{3}(-1)^{\delta_{ij}}K_j} \right). \quad (2)$$

Figure 3:
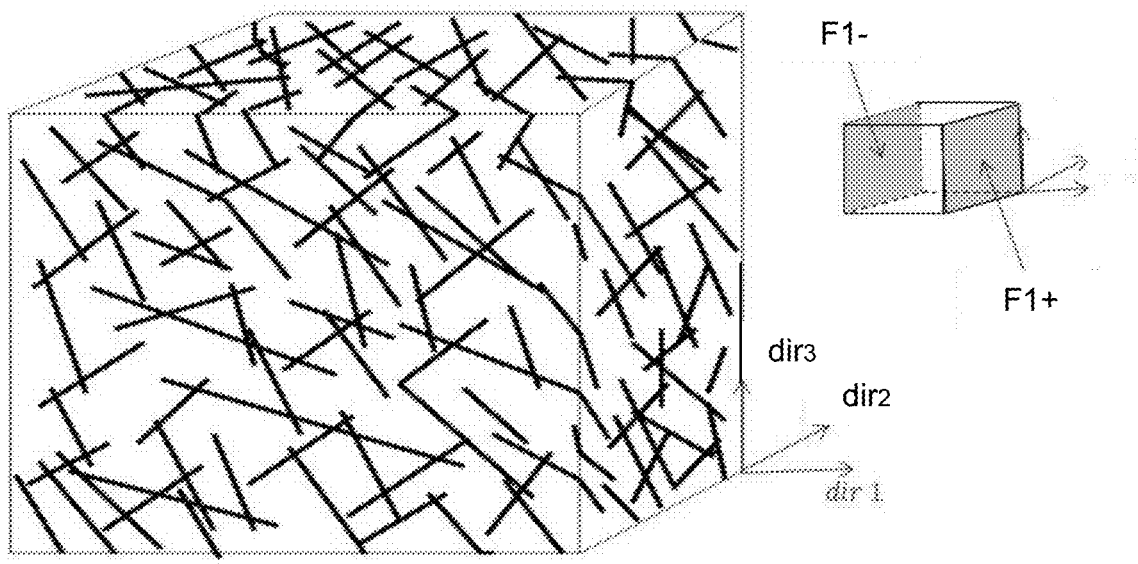
FIG. 3 shows on the left a mesh of a meshed representation, re-oriented according to the principal directions of flow, and on the right and shaded the faces of the re-oriented mesh perpendicular to one of the flow directions.

According to one embodiment of the invention, a characteristic dimension of the matrix block is determined according to a relation that is a function of at least the eigenvalues of the equivalent permeability tensor of the fractured medium calculated in the step 2.2 and an equivalent surface permeability tensor of the fracture medium. According to one embodiment, the equivalent surface permeability tensor is calculated by at least the following steps:

the mesh concerned is re-oriented according to the principal flow directions (calculated in the step 2.3). FIG. 3 illustrates this step, with a mesh (left-hand part of FIG. 3) being re-oriented according to the principal flow directions $dir_1$, $dir_2$, $dir_3$;

for each principal flow direction, there is determined the flow of the fluid exiting traces of fractures present on the faces (of the re-oriented mesh) perpendicular to the principal direction concerned. The faces F1+ and F1− perpendicular to the direction $dir_1$ are shaded in FIG. 3, for example (right-hand part of FIG. 3). According to one embodiment of the invention, the re-oriented mesh is constructed so that the areas of the faces Fi+ and Fi− are identical;

for each principal flow direction the equivalent surface permeability is determined in the direction concerned by equivalence of the flow with a flow representative of a homogeneous medium.

According to this last embodiment, an equivalent surface permeability $K_i^s$ in the principal direction $dir_i$ (with i varying from 1 to 3) is obtained that may be expressed using o a formula of the following type:

$$K_i^S = \frac{1}{2S_i} \sum_{f=0 \ldots nbfr(i)} k_f^i l_f^i e_f^i \qquad (4)$$

where nbfr(i) is the number of fractures intersecting the faces Fi+ and Fi−, $k_f^i, l_f^i$ and $e_f^i$ are respectively their permeability, length and openness on the face i, $S_i$ is the average area of the faces Fi+ and Fi−. If the permeability tensor is determined considering constant fracture thicknesses and permeabilities for all the fractures of the network of fractures (cf. sub-step 2.2), the result is an equivalent surface permeability $K_i^s$ in the principal direction dirt (with i varying from 1 to 3) that may be expressed according to a formula of the following type:

$$K_i^S = \frac{k_f e_f}{2S_i} \sum_{f=0 \ldots nbfr(i)} l_f^i \qquad (4')$$

where nbfr(i) is the number of fractures intersecting the faces Fi+ and Fi−, $l_f^i$ is their length on the face i, $S_i$ is the average area of the faces Fi+ and Fi−, and $k_f$ and $e_f$ are respectively values predefined by the reservoir engineer of permeability and thickness representative of all the fractures of said network of fractures. According to one embodiment of the invention $k_f$=100 mD and $e_f$=0.001 m.

According to one embodiment of the invention, the characteristic dimension of the matrix block of the mesh concerned in the direction $dir_i$ (with i varying from 1 to 3) is determined according to a formula of the following type (using the notation described above):

$$l^i = \left( (\Phi - P_{21}^i)^{-1} \frac{\sum_{j=1}^{3}((-1)^{\delta_{ij}} K_j^S)}{\sum_{j=1}^{3}(-1)^{\delta_{ij}} K_j} - 1 \right) \qquad (5)$$

where $\Phi$ is the porosity of the fractures present in the mesh concerned and $P_{21}^i$ is the average ratio between the area of fractures on the faces of the mesh perpendicular to the principal direction dirt and the area of said faces. According to one embodiment of the invention, the ratio $p_{21}^i$ may be expressed according to a formula of the following type (using the notation described above):

$$P_{21}^i = \frac{1}{2S_i} \sum_{f=0 \ldots nbfr(i)} e_f^i l_f^i \qquad (6)$$

If the permeability tensor is determined considering constant fracture thicknesses and permeabilities for all the fractures of the network of fractures (cf. sub-step 2.2), the formula (6) may be simplified as follows:

$$P_{21}^i = \frac{e_f}{2S_i} \sum_{f=0 \ldots nbfr(i)} l_f^i \qquad (6')$$

2.5 Quality Control (Optional)

This sub-step is optional and consists in determining at least one criterion making it possible to assess if it is acceptable to represent a given mesh by a plurality of matrix blocks with the same characteristic dimension.

According to a first embodiment of the invention, a geometrical parameter $E_{geom}$ is determined using a formula of the following type (using the notation described for the preceding sub-step):

$$E_{geom} = \frac{\Phi - \frac{1}{2} \sum P_{21}^i}{\Phi}$$

Thus the more homogeneous the network of fractures in the mesh concerned, the smaller the error $E_{geom}$, and therefore the greater the justification for breaking down a given mesh by means of matrix blocks with the same characteristic dimension. According to one embodiment of the invention, a criterion is considered indicating that it is necessary to determine at least two matrix block dimensions for the mesh concerned if the geometrical parameter $E_{geom}$ is greater than a value predefined by the reservoir engineer, for example if $E_{geom}$ is greater than 50%.

According to another embodiment of the invention, a dynamic parameter $E_{dyn}^i$ is determined for a given principal direction $dir_i$ (with i varying from 1 to 3) using a formula of the following type (with the notation described for the preceding sub-step):

$$E_{dyn}^i = \frac{\sum_{j=1}^{3}(-1)^{\delta_{ij}} K_j - k_f \sum_{j=0}^{3}((-1)^{\delta_{ij}} P_{21}^i)}{\sum_{j=0}^{3}(-1)^{\delta_{ij}} K_j}$$

Accordingly, the more homogeneous the network in the mesh concerned, the smaller the error $E_{dyn}^i$, and therefore the greater the justification for breaking down a given mesh by means of matrix blocks with the same characteristic dimension. According to one embodiment of the invention, it is considered that it is necessary to determine at least two matrix block dimensions for the mesh concerned if the dynamic parameter $E_{dyn}^i$ is greater than a value predefined by the reservoir engineer, for example if $E_{dyn}^i$ is greater than 50% for at least one of the principal flow directions (dirt, with i varying from 1 to 3), for at least two directions, or indeed for the three directions.

According to an embodiment of the invention in which a criterion making it possible to evaluate the pertinence of representing a given mesh only by matrix blocks with the same dimension is not satisfied (for example if at least the geometrical parameter $E_{geom}$ or the dynamic parameter $E_{dyn}^i$ has a value greater than an acceptable value predefined by the reservoir engineer), the method described in the patent FR 2923930 (corresponding to U.S. Pat. No. 8,688,424) may be used for the mesh concerned. This method makes it possible to calculate a matrix block size representative of the unfractured blocks of rock on the basis of a discrete fracture network model, image analysis and interpolation of an invasion curve.

The steps 2.1 to 2.4 (and where applicable 2.5) may be repeated for each of the meshes of the meshed representation of the formation concerned or for each of the meshes representative of groups of meshes of the meshed representation where applicable (cf. optional step 1.2). When the steps 2.1 to 2.4 (and where applicable 2.5) are carried out for a representative mesh of a group of meshes, the meshes of the group of meshes are advantageously assigned the equivalent permeability tensor and/or the matrix block characteristic dimension determined for the representative mesh concerned. In this way, the calculation of the equivalent permeability tensor and/or the characteristic dimension being limited to the representative meshes, calculation time is saved.

3. Optimum Exploitation Scheme of the Fluid from the Formation

During this step, it is a question of defining at least one optimum exploitation scheme of the fluid contained in the formation which is an exploitation scheme making possible optimum exploitation of a fluid concerned according to technical and economic criteria predefined by the reservoir engineer. It may be a question of a scenario offering a high level of recovery of the fluid over a long exploitation time and necessitating a limited number of wells. According to the invention, the fluid of the formation being studied is then exploited as a function of this optimum exploitation scheme.

According to the invention, the exploitation scheme is determined by use of a flow simulation exploiting at least the meshed representation of the formation being studied, the matrix block characteristic dimension calculated in the sub-step 2.4 and an equivalent permeability tensor of the network of fractures, quantities determined for at least one mesh of the meshed representation. According to one embodiment of the invention, the equivalent permeability tensor used for the flow simulation is determined on the basis of the characteristics of the network of fractures in each of the meshes of the meshed representation (compare sub-step 2.2). The quantities required for the flow simulation have advantageously been determined for each mesh of the meshed representation or for at least each representative mesh of groups of meshes of the meshed representation. In this latter case, the values determined for a given representative mesh are advantageously assigned to all the meshes of said group.

According to one embodiment of the invention, this step employs a flow simulation based on a "double-medium" approach. For this type of flow simulation, the flow of the fluids occurs through the fractures for the most part and exchanges of fluids occur locally between the fractures and the matrix blocks (matrix-fissure exchange). One example of a double-medium flow simulator is the PumaFlow software from IFP Energies nouvelles, France.

According to the invention, at any time t in the simulation, the flow simulator solves all the flow equations specific to each mesh and delivers solution values of the unknowns (saturations, pressures, concentrations, temperature, etc.) predicted at that time t. From this solution stems the knowledge of the quantities of oil produced and of the status of the deposit (distribution of pressures, saturations, etc.) at the time concerned. Based on a given exploitation scenario, the double-medium representation of the deposit and the formula linking the mass exchange at least one of flow and energy to the matrix-fracture potential difference, it is then possible to simulate the planned production of hydrocarbons by use of the double-medium flow simulator.

An exploitation scheme for the fluid of the formation being studied may be defined by choosing a type of recovery method (for example a water injection recovery method) and then, for that type of method, determining the number, the geometry and the layout (position and spacing) of the injector and producer wells in order to take optimum account of the impact of the fractures on the progression of the fluids in the reservoir. In order to define an optimal exploitation scheme, various tests of various production scenarios may be carried out using a flow simulator. The exploitation scheme offering the best fluid recovery level for the lowest cost will be preferred, for example.

By selecting various scenarios, characterized for example by various respective layouts of the injector and producer wells, and by simulating the production of fluid for each of them, it is possible to select the scenario making it possible to optimize the production from the formation concerned according to technical and economic criteria predefined by the reservoir engineer.

The reservoir engineers then exploit the fluid of the formation concerned according to the scenario making it possible to optimize the production from the deposit, notably by drilling the injector and producer wells defined by the optimum exploitation scheme and producing the fluid by the recovery method defined by the optimum exploitation scheme.

The invention further concerns a computer program product downloadable from at least one of a communication network and stored on a tangible computer-readable medium which is executable by a processor, comprising program code instructions for executing the method having any of the foregoing features when the program is executed by a computer.

Application Example

The features and advantages of the method according to the invention will become more clearly apparent on reading the following application examples.

The present invention was applied to a subterranean formation comprising ten layers. The meshed representation of this formation contained 1 050 000 meshes (350×300× 10).

In a first example, it was considered that the subterranean formation was characterized by two families of structures:
- a first family, having a spacing between fractures of 5 m, the fractures of this family having a mean length of 20 m and a mean orientation of 10°;
- a second family, having a spacing between fractures of 3 m, the fractures of this family having a mean length of 45 m and a mean orientation of 100°.

Figure 4:
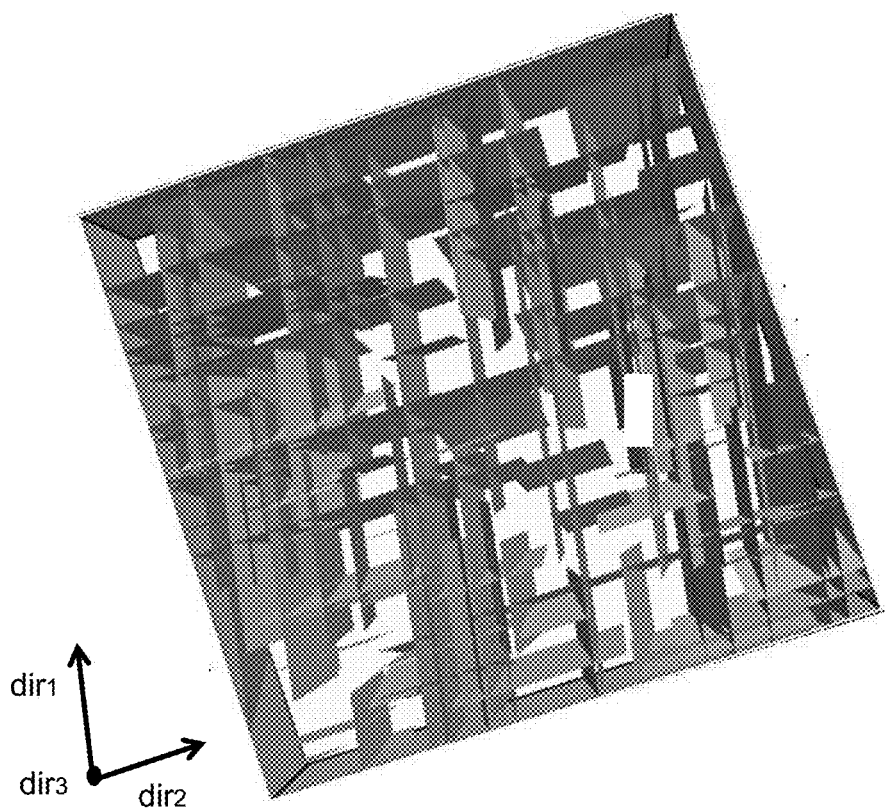
FIG. 4 is a three-dimensional top view of an example of a network of fractures.

FIG. 4 shows by way of illustration the distribution of these two families of fractures in the formation. It can notably be seen in this figure that the two families of fractures are substantially mutually orthogonal. This figure shows in particular the principal flow directions $dir_1$ and $dir_2$, which are substantially parallel to the orientations of these two families of fractures.

For comparison purposes, a matrix block characteristic dimension is determined using two prior art methods (the pixelization method and the ray tracing method described above) and the method according to the invention.

The calculation times for each of these methods applied to all of the meshes of the meshed representation are set out in table 1. Note in particular that the calculation times produced by the method according to the invention (column 3) are very much less than those produced by the pixelization method (column 1) and even those produced by the ray tracing method (column 2).

TABLE 1

| Pixelization | Ray tracing | Invention |
| --- | --- | --- |
| >>50 days | 1 123 s | 236 s |

The values of the matrix block characteristic dimensions produced by each of these three methods are indicated in table 2. It can be seen that the pixelization method (column 2) enables a good approximation of the matrix block sizes but remains farthest from the true sizes (9.6 m rather than 5 m in direction 1 and 4.2 m rather than 3 m in direction 2). The ray tracing method (column 3) offers a good approximation of the expected dimensions but generally speaking has the disadvantage of being dependent on the position of the rays and the number of rays used. The matrix block characteristic dimension produced by the method according to the invention (column 4) is the closest to the real-life situation regardless of the flow direction concerned.

TABLE 2

| Characteristic dimension (m) | Pixelization | Ray tracing | Invention |
| --- | --- | --- | --- |
| Direction 1 | 9.6 | 3 | 5 |
| Direction 2 | 4.2 | 3.2 | 3.9 |

In a second example (not shown) the first family of fractures was considered to have a mean orientation of 70°. All the fractures of the simplified fracture model will therefore tend to be oriented in the flow direction $dir_1$. This should be reflected in an increase of the matrix block size in the direction $dir_1$ and a reduction of the block size in the direction $dir_2$ (more fractures will be intersected in this direction). This behavior was captured better by the method according to the invention (column 4 table 3) than by the ray tracing method (column 3 of table 3) and the pixelization method (column 2 of table 3). Moreover, the method according to the invention has the advantage of being independent of the position and the density of the rays traced and captures better the effects of the connectivity of the network.

TABLE 3

| Characteristic dimension (m) | Pixelization | Ray tracing | Invention |
| --- | --- | --- | --- |
| Direction 1 | 9.6 | 8.3 | 33 |
| Direction 2 | 4.5 | 2.5 | 2.2 |

The method according to the invention therefore in particular makes it possible to determine a relatively precise matrix block characteristic dimension with reasonable calculation times, rendering the method routinely applicable. Moreover, the method according to the invention does not necessarily require calculation of a discrete fracture network model. Moreover, the method according to the invention does not need a 2D hypothesis (with a layer by layer application in particular), which makes it applicable to three-dimensional fracture networks. The matrix block characteristic dimensions determined in this way by the method according to the invention can then be integrated into a more general method of exploitation of a fluid from a subterranean formation, including at least one flow simulation step.

The invention claimed is:
1. A method of exploitation of fluid in a subterranean formation crossed by a network of fractures in which, based on measurements of properties relating to the formation, a meshed representation of the formation is constructed and statistical parameters are determined relating the network of fractures, for at least one mesh of the meshed representation of the formation comprising:
   A. constructing a double medium meshed representation by breaking down each mesh into a set of identical matrix blocks with each matrix block being parallelpiped in shape, representing a non-fractured portion of the formation and being delimited by an orthogonal system of uniform fractures;
   B. determining an equivalent permeability tensor of the network of fractures in the mesh;
   C. determining principal orthogonal directions of flow and eigenvalues of the equivalent permeability tensor in the determined principal orthogonal directions of flow; and
   D. determining a characteristic dimension of the matrix blocks of the mesh according to a relationship which is a function of at least the eigenvalues of the equivalent permeability tensor;
   determining an optimum exploitation scheme of the fluid in the formation based on at least the double medium mesh representation, the characteristic dimension of the matrix blocks of the mesh and a flow simulation of the formation; and
   exploiting the fluid in the formation in accordance with the optimum exploitation scheme; and wherein
   the characteristic dimension of the matrix blocks of each mesh is determined by a relationship as follows:

$$t^i = \left( \frac{2k_f e_f}{\sum_{j=1}^{3} (-1)^{\delta ij} K_j} \right),$$

where $K_j$ is the eigenvalue of the equivalent permeability tensor of the principal orthogonal direction j of flow, with j varying from 1 to 3, $k_f$ and $e_f$ are respectively determined values of permeability of the formation and thickness representative of all fractures, and ti is the characteristic dimension of a matrix block in a principal direction of flow i with i varying from 1 to 3.

2. The method as claimed in claim 1, wherein the statistical parameters are chosen from fracture density, fracture length, fracture orientation in space, fracture openness and distribution of fractures in the formation.

3. The method as claimed in claim 1, wherein the equivalent permeability tensor of each mesh is determined by previously constructing a discrete fracture model for each mesh.

4. The method as claimed in claim 2, wherein the equivalent permeability tensor of each mesh is determined by previously constructing a discrete fracture model for each mesh.

5. The method of claim 1, wherein the characteristic dimension of the matrix blocks of the mesh is determined using a relationship which is a function of at least the eigenvalues of the equivalent permeability tensor and an equivalent surface permeability tensor which characteristic dimension is determined by at least steps:

reorienting the principal directions of flow;

determining for each principal direction of flow, the flow of the fluid leaving traces of fractures present on faces of a re-oriented mesh perpendicular to the principal direction; and determining for each principal direction of flow, the equivalent surface permeability in the direction of flow by equivalence of the flow with a flow representative of a homogeneous medium.

6. The method of claim 2, wherein the characteristic dimension of the matrix blocks of the mesh is determined using a relationship which is a function of at least the eigenvalues of the equivalent permeability tensor and an equivalent surface permeability tensor which characteristic dimension is determined by at least steps:

reorienting the principal directions of flow;

determining for each principal direction of flow, the flow of the fluid leaving traces of fractures present on faces of a re-oriented mesh perpendicular to the principal direction; and determining for each principal direction of flow, the equivalent surface permeability in the direction of flow by equivalence of the flow with a flow representative of a homogeneous medium.

7. The method of claim 3, wherein the characteristic dimension of the matrix blocks of the mesh is determined using a relationship which is a function of at least the eigenvalues of the equivalent permeability tensor and an equivalent surface permeability tensor which characteristic dimension is determined by at least steps:

reorienting the principal directions of flow;

determining for each principal direction of flow, the flow of the fluid leaving traces of fractures present on faces of a re-oriented mesh perpendicular to the principal direction; and determining for each principal direction of flow, the equivalent surface permeability in the direction of flow by equivalence of the flow with a flow representative of a homogeneous medium.

8. The method of claim 4, wherein the characteristic dimension of the matrix blocks of the mesh is determined using a relationship which is a function of at least the eigenvalues of the equivalent permeability tensor and an equivalent surface permeability tensor which characteristic dimension is determined by at least steps:

reorienting the principal directions of flow;

determining for each principal direction of flow, the flow of the fluid leaving traces of fractures present on faces of a re-oriented mesh perpendicular to the principal direction; and determining for each principal direction of flow, the equivalent surface permeability in the direction of flow by equivalence of the flow with a flow representative of a homogeneous medium.

9. The method of claim 1, comprising determining a criterion of acceptability of each mesh by using matrix blocks having an identical characteristic dimension.

10. The method of claim 1, wherein the mesh for which steps (A) to (D) is carried out is representation of a group of meshes of the double meshed representation which are determined based on at least one statistical parameter and in which in step (D) the characteristic dimension is assigned to the matrix blocks of the meshes of the group.

11. The method of claim 1, wherein the optimum exploitation scheme is determining by a method of recovery of the fluid and number, a layout and a geometry of at least one of an injection and a production well which satisfies predefined technical and economic criteria.

12. The method of claim 9, wherein the exploitation of the fluid is an optimum exploitation scheme which drills least one injection and production well and producing the fluid by the recovery method.

\* \* \* \* \*